April 4, 1933.   J. C. CROWLEY   1,903,392
VALVE STEM AND ADAPTER
Filed Nov. 1, 1929   2 Sheets-Sheet 1

Inventor
JOHN C. CROWLEY.
Kwis Hudson & Kent
Attorneys.

April 4, 1933. J. C. CROWLEY 1,903,392
VALVE STEM AND ADAPTER
Filed Nov. 1, 1929  2 Sheets-Sheet 2

Inventor
JOHN C. CROWLEY.
Kwis Hudson & Kent
Attorneys.

Patented Apr. 4, 1933

1,903,392

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE STEM AND ADAPTER

Application filed November 1, 1929. Serial No. 403,996.

This invention relates to a valve stem and, more particularly to a valve stem provided with an adapter or extension whereby a valve stem of other than the usual standard construction of valve stem may be equipped to use a standard valve insides.

An object of the invention is to provide a valve stem and an adapter or extension therefor which are so constructed that pneumatic tire tubes equipped with such stems may be interchangeably used on different types of wheels.

Another object is to provide a valve stem and an adapter or extension therefor which are so constructed that the adapter may be assembled with the stem so as to have that portion of the adapter containing the valve insides located in any desired position with the parts, when thus assembled, held against relative rotation.

Additional objects and advantages will become apparent hereinafter.

Embodiments of the invention are illustrated in the accompanying drawings wherein—

Figure 1:
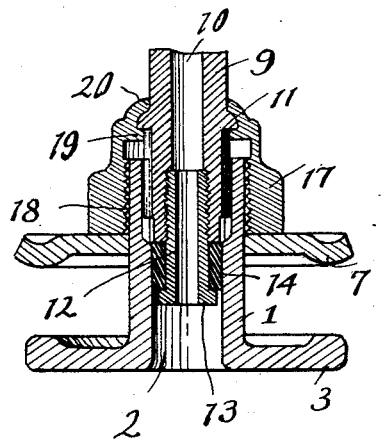
Fig. 1 is a sectional view of the assembled valve stem, a portion of the adapter, and the nut for holding the stem and adapter in assembled position.
Figure 3:
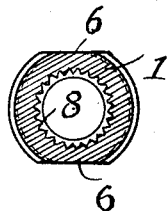
Fig. 3 is a horizontal sectional view taken approximately on line 3—3 of Fig. 2, the spreader plate at the inner end of the valve stem being omitted in this view.
Figure 2:
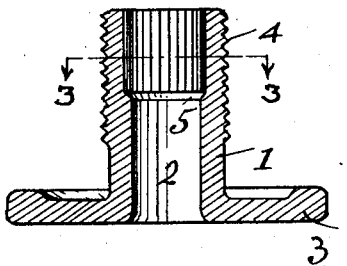
Fig. 2 is a sectional view of the valve stem.
Figure 4:
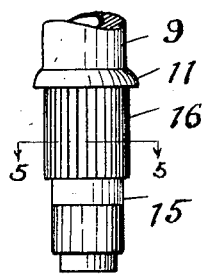
Fig. 4 is a fragmentary side elevation of the adapter or extension.
Figure 5:
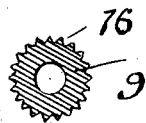
Fig. 5 is a horizontal sectional view taken on line 5—5 of Fig. 4, showing the formation of a portion of the adapter.

As is well known, the conventional type of valve stem is made of a tubular piece of brass which has an externally threaded portion at one end provided with an end part of reduced diameter. The valve stem is formed with a tapered shoulder adjacent its outer end arranged in the central bore through the stem, which shoulder is adapted to receive the portion of a standard valve insides. These valve stems are made of brass in order to permit of easy insertion or removal of the valve insides and prevent the insides from becoming frozen within the stem after they have been inserted therein a long period of time and subjected to use and weather conditions.

The construction described herein relates to a valve stem made of steel or other suitable metal and an adapter or extension formed of non-corroding metal, such as brass.

There are certain types of wheels which require that the portion of the valve stem containing the valve insides be located adjacent the rim flange of the wheel. This has necessitated the use of different stems upon tire tubes which are to be used with such wheels, as heavy disk wheels, than are usually used upon the ordinary spoke type of wheel. This is because in the ordinary spoke type of wheel, the valve stem may be straight, while in the special types of wheels, referred to above, it is necessary to locate the valve insides adjacent the rim flange of the wheel and, therefore, such insides are not in axial alignment with the valve stem. This has required the use of a bent adapter or extension in order to position the valve insides at the proper location. Even when using such an adapter or extension, it is necessary to vary the position of the end thereof which contains the valve insides with different wheels or types of wheels and considerable difficulty has arisen in assembling the extension and stem to attain this proper position of the end of the extension and, at the same time, have the portions of the stem and extension which maintain these members against relative rotation in the proper cooperating relationship.

The present invention discloses a valve stem and an adapter or extension therefor which may be used upon tire tubes irrespective of the type of wheels upon which the tubes are mounted and which are so constructed as to enable the position of the end of the adapter or extension to be varied as desired and yet have the members maintained against relative rotation when assembled.

The valve stem 1 is a tubular member provided with an internal bore 2 and having adjacent one of its ends a head 3 which is adapted to cooperate with a spreader plate later to be described, for clamping portions of an inner tube between the head and the spreader plate, as is well understood in the art. The other end of the stem 1 is externally threaded at 4, while the bore 2 adjacent such end is enlarged and is connected to the smaller portion of the bore by a tapered shoulder 5. The stem 1 is provided with one or more flats 6 on its exterior surface in order to maintain the spreader plate 7 in the proper position, such spreader plate having a central opening provided with corresponding flats to cooperate with the flats 6 on the stem.

The enlarged portion of the bore of the stem 1 is provided with a circumferential continuous series of grooves extending longitudinally from the upper end of the stem to the tapered shoulder 5, these grooves being preferably formed as a series of inwardly projecting longitudinally extending serrations 8. The adapter is indicated at 9 and is provided with a central bore 10 adapted to communicate with the bore in the stem 1. Preferably the adapter or extension is in the form of a single or double elbow so that the portion of the adapter which contains the valve insides will be located adjacent the rim flange of the wheel, but it should be understood in certain instances a straight adapter would be used. Of course, this portion of the adapter is suitably threaded for the reception of a suitable form of dust cap or closure member as is usual in such constructions.

The complete adapter has not been shown herein since the construction of the same is well understood in the art and since the novel portion thereof embraced by the present invention is located at the end of the adapter that cooperates with the valve stem, which part of the adapter is straight and is provided with an outwardly extending annular rib 11, inwardly of the end of the adapter, while the bore 10 adjacent this end is internally threaded to receive an externally threaded tubular member 12 having an annular shoulder 13 at its lower end for the purpose of maintaining a packing gasket 14 between the same and the lower end of the adapter, such gasket being of slightly greater diameter than the diameter of a reduced portion 15 of the adapter.

Intermediate the rib 11 and the reduced portion 15 of the adapter a continuous series of outwardly projecting longitudinally extending grooves 16 are provided, such grooves being in the form of serrations, complementary to the serrations 8 in the bore of the valve stem. An assembling nut 17 having an enlarged portion internally threaded at 18 and a reduced upper portion provided with inwardly extending spaced arms or ribs 19 and 20, which define an annular groove swivelly receiving the annular rib 11 on the adapter is used for connecting together the stem and adapter. The adapter is preferably assembled with the nut as a unit, this being effected by inserting the end of the adapter through the nut until the rib 11 engages the arm or rib 19 of the nut and then forcing the arm or rib down upon the rib 11. When the adapter is to be assembled in the valve stem, it is arranged above the same so that the end of the adapter containing the valve insides is in the proper position, after which the adapter is moved longitudinally into the stem with the grooves or serrations 16 of the adapter engaging in the longitudinal grooves or serrations 8 of the stem. Rotation of the nut 17 will cause the adapter to move longitudinally into the stem until it has been forced into the proper position with the packing 12 engaging the reduced portion of the bore 2.

It will be apparent that while the grooves or serrations of the adapter and the stem prevent these members from having relative rotation, they do not prevent the proper positioning of the adapter since the grooves or serrations being a continuous series, the adapter may be moved through three hundred and sixty degrees if necessary to properly position the end thereof and the cooperating serrations will still effect the function for which they were designed.

Figure 6:
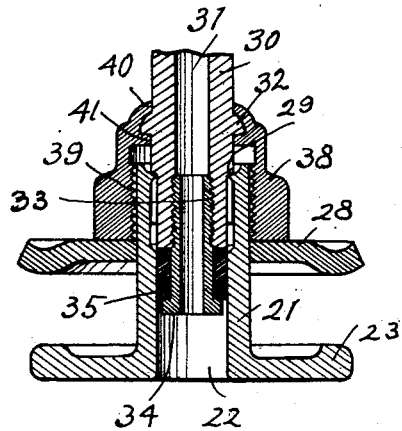
Fig. 6 is a sectional view of a modified form, showing the assembled valve stem, a portion of the adapter, and the nut for holding the stem and adapter in assembled position.
Figure 8:
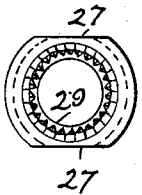
Fig. 8 is a top plan view of the stem, the spreader plate at the inner end thereof being omitted.
Figure 7:
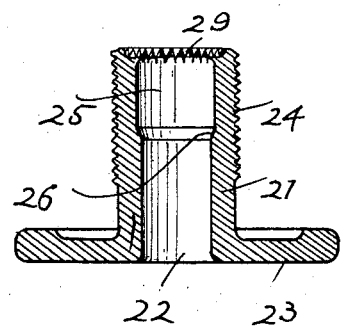
Fig. 7 is a sectional view of the valve stem of Fig. 6.
Figure 9:
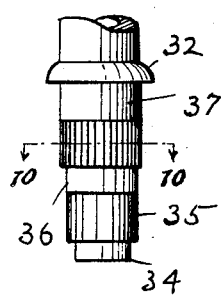
Fig. 9 is a fragmentary side elevation of the adapter or extension after the same has been removed from assembly with the stem.
Figure 10:
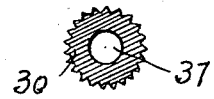
Fig. 10 is a horizontal sectional view taken on line 10—10 of Fig. 9.

In the form shown in Figs. 6 to 10, inclusive, the valve stem 21 is a tubular member provided with an internal bore 22 and having adjacent one of its ends a head 23 adapted to cooperate with a spreader plate, later to be described, for clamping portions of an inner tube between the head and the spreader plate, as is well understood in the art. The other end of the stem 21 is externally threaded at 24 while the bore 22 adjacent such end is enlarged, as indicated at 25, and is connected to the smaller portion of the bore by a tapered shoulder 26. The stem 21 is provided with one or more flats 27 on its external surface in order to maintain the spreader plate 28 in the proper position, such spreader plate having a central opening provided with flats cooperating with the flats 27 on the stem. A continuous circumferential series of inwardly projecting teeth 29 are formed in the enlarged portion 25 of the bore of the valve stem adjacent the outer end thereof. Preferably, these teeth are formed by peening inwardly the upper circumferential edge of the bore with the result that the teeth are located slightly inwardly of the upper end of the stem. The adapter or extension is indicated at 30 and is provided with a central bore 31 adapted, when the members are assembled, to communicate with the bore in the stem 21. Preferably, the adapter or extension is in the form of a single or double elbow so that the portion of the adapter which contains the valve insides will be located adjacent the rim flange of the wheel, but it should be understood that in certain instances the straight adapter would be used. Of course, this portion of the adapter is suitably threaded for the reception of a suitable form of dust cap or closure member as is used in such constructions.

The complete adapter has not been shown herein since the construction of the same is well understood in the art and since the novel portion thereof embraced by the present invention is located at the end of the adapter that cooperates with the valve stem, such part of the adapter being straight and provided with an outwardly extending annular rib 32 inwardly of the end of the adapter while the bore 31 adjacent this end is internally threaded to receive an externally threaded tubular member 33 having an annular shoulder 34 at its lower end, for the purpose of maintaining a packing gasket 35 between the same and the lower end of the adapter, such gasket being of slightly greater diameter than the diameter of the reduced portion 36 arranged at the end of the adapter. Between the reduced portion 36 and the rib 32 the adapter has a portion 37 of substantially the same diameter as the gasket 35, the circumference of such portion being smooth before the adapter has been assembled with the stem. A nut 38 having an enlarged portion internally threaded at 39 and a reduced upper portion provided with inwardly extending spaced arms or ribs 40 and 41, which define an annular groove swivelly receiving the annular rib 32 on the adapter, is used for connecting together the stem and adapter. The adapter is preferably assembled with the nut as a unit, this being effected by inserting the end of the adapter through the nut until the rib 32 engages the arm or rib 41 after which the arm or rib 40 of the nut is forced down upon the rib 32. When the adapter is to be assembled in the valve stem it is arranged above the same with the end of the adapter containing the valve insides in the proper position, after which the adapter is moved longitudinally into the stem until the threads 39 of the nut engage with the threads 24 of the stem. Rotation of the nut will then cause the adapter to move longitudinally inwardly of the bore of the stem while the continuous circumferential series of inwardly projecting cutting teeth 29, adjacent the upper end of the stem, will cut into the relatively soft metal of the portion 37 of the adapter and form an interlock which will maintain the stem and adapter against relative rotation. It will thus be seen that the members when assembled will be held against relative rotation but that it will be possible to correctly position the valve insides receiving end of the adapter, since the adapter may be turned to any position prior to insertion of the end thereof into the bore of the valve stem.

Although preferred embodiments of the invention have been illustrated and described herein, it should be understood that the same is susceptible of various modifications and adaptations within the scope of the appended claims.

Having thus described my invention, what I claim is:

1. In combination, a valve stem having an exteriorly threaded portion at one end and a head at the other end and provided with a bore extending therethrough, said bore adjacent the exteriorly threaded end of the stem being provided with a circumferential series of inwardly projecting teeth, an adapter having a bore extending therethrough and an end portion arranged in the bore of the valve stem, and a nut cooperating with the threaded portion of the valve stem and having a swiveled connection with the adapter for moving the end of the latter into the bore of the stem and holding the stem and adapter assembled, said series of inwardly projecting teeth cutting into the end portion of the adapter and forming an interlock therewith to maintain the adapter and stem against relative rotation.

2. In combination, a valve stem having an exteriorly threaded portion at one end and a head at the other end and provided with a bore extending longitudinally therethrough, said bore having an enlarged portion the wall of which is provided with a circumferential series of longitudinally disposed serrations, an adapter having a bore extending longitudinally therethrough and a portion complementary to the enlarged portion of the stem bore and provided with a circumferential series of longitudinally disposed serrations complementary to the serrations in said enlarged portion of the stem bore, said adapter having an end portion which has an airtight fit within the valve stem bore, and a nut cooperating with the threaded portion of the valve stem and having a swivel connection with the adapter for moving the end portion of the latter into the bore of the stem and holding the stem and adapter assembled.

3. In combination, a valve stem having an exteriorly threaded portion at one end and a head at the other end and provided with a bore extending longitudinally therethrough, said bore having an enlarged portion the wall of which is provided with a circumferential series of inwardly extending serrations, an adapter having a bore extending longitudinally therethrough and a portion complementary to the enlarged portion of the stem bore and provided with serrations engaging the serrations in the stem bore to hold the stem and adapter against relative rotation, said adapter having an end portion which has an air-tight fit within the stem bore, and a nut cooperating with the threaded portion of the valve stem and having a swivel connection with the adapter for moving the end portions of the latter into the bore of the stem and holding the stem and adapter assembled.

In testimony whereof, I hereunto affix my signature,

JOHN C. CROWLEY.